Feb. 17, 1970 — M. K. LONG — 3,495,472
PRESS DRIVE
Filed Sept. 29, 1967 — 2 Sheets-Sheet 1

INVENTOR.
MILLARD K. LONG
BY
Meyer, Tilberry & Body
ATTORNEYS.

INVENTOR.
MILLARD K. LONG
BY
Meyer, Tilberry & Body
ATTORNEYS.

United States Patent Office 3,495,472
Patented Feb. 17, 1970

3,495,472
PRESS DRIVE
Millard K. Long, North Canton, Stark, Ohio, assignor to E. W. Bliss Company, Canton, Ohio, a corporation of Delaware
Filed Sept. 29, 1967, Ser. No. 671,754
Int. Cl. G05g 1/00, 3/00; F16h 21/22
U.S. Cl. 74—570                                  8 Claims

ABSTRACT OF THE DISCLOSURE

The press has a crankshaft with a stepped configuration with each stepped portion being concentric and coaxial. A pre-machined eccentric is removably supported on the crankshaft and counterweights may be added or removed to the crankshaft as desired. The bearings supporting the crankshaft are located immediately adjacent the eccentric with the counterweights, when added, outside of the bearings. The entire crankshaft assembly is removably supported in a slotted housing.

---

This invention relates to presses and more particularly to an improved drive for presses.

It is conventional in the manufacture of open back inclinable presses which employ L–R type crankshafts to manufacture the crankshafts from forgings with counterweight crankshafts cheeks and integral eccentrics. Due to the presence of the counterweight cheeks, the bearings which support the crankshaft in the press frame are located at a considerable distance from the connection rod and eccentric with the result that the crankshaft is subject to substantial bending forces causing undue wear on the shaft and the connection bearings. Moreover, because of the integral nature of the crankshaft with its eccentric and counterweights, it is necessary to employ split bearings in supporting the crankshaft in the press frame. The use of split bearings raises substantial problems in assembly and proper fitting of the bearings to the shaft and the frame. In addition, manufacturing of a crankshaft with an integral eccentric always creates problems since it is necessary to manufacture with two centers.

To avoid bending of the crankshaft, the prior art either has made the crankshaft much heavier in construction, which increased the cost of the shaft, or used a weak shaft and limited the capacity of the press. However, a press may frequently run at relatively low speeds and require no counterweights on the crankshaft at all in which case the counterweights serve no useful purpose and, in fact, could be dispensed with thereby permitting better bearing support for the shaft. Nonetheless, the usual practice has been to provide a crankshaft with counterweights so that a press would be capable of operating both at high and low speeds.

This invention provides a drive for a press which overcomes all of the problems mentioned hereinabove. It is contemplated that the press made in accordance with this invention will employ a frame which has slotted openings to receive bearing housings which support the crankshaft on the frame. The bearing housings are retained in the slotted openings by appropriate retainers which permit the removal of the bearing housings and the crankshaft when desired.

Also in accordance with this invention, it is contemplated that the crankshaft will comprise a stepped concentric shaft with each stepped portion of the shaft being concentric and coaxial with the other portions of the shaft. A pre-machined eccentric having an opening therethrough is slipped over the shaft and into engagement with one of the stepped portions on the shaft whereby the crankshaft and eccentric rotate as a unit. Keys or splines may be used to interconnect the eccentric with the shaft. Because of the concentric nature of the shaft it no longer is necessary to employ split bearings and it is contemplated that full round oil grooved bearings supported in full round bearing housings may be employed with the bearings located immediately adjacent the eccentric on the crankshaft. If it is desired to use counterweights, such counterweights may be slipped over the crankshaft outside of the bearings and removed when no longer required.

Also in accordance with this invention, it is contemplated that the shaft with the bearings, eccentric, bearing housings and the clutch and brake normally employed on such a press may all be mounted on the press as a package thereby facilitating assembly.

Thus, one primary object of this invention is to provide a press in which a stepped concentric diameter shaft is employed as the crankshaft with pre-machined eccentrics and counterweights being removably supported on the crankshaft.

Another primary object of this invention is to provide a drive assembly for a press in which the bearings for the crankshaft are located immediately adjacent the eccentric on the crankshaft to minimize the bending forces applied to the shaft.

Still another important object of this invention is to provide a drive assembly for a press in which the crankshaft with the bearings, eccentric, bearing housing, and the associated clutch and brake may be assembled in the frame of the press as a package.

Another object of the invention is to provide a drive for a press in which the crankshaft bearings may be full round oil grooved bearings supported in full round bearings housings.

It is a further object of this invention to provide a drive assembly for a press in which the crankshaft may be used either in a right hand drive or a left hand drive.

Still another object of this invention is to provide a crankshaft assembly in which the crankshaft is fully interchangeable between right hand and left hand drives and in which a larger bearing may be used on the brake and clutch side of the crankshaft irrespective of the orientation of the crankshaft.

Still another object of the invention is to provide a crankshaft assembly for a press in which counterweights may be added or removed depending on the particular application and speed at which the press is to be operated.

A better understanding of the objects and features of the invention will be had from the following description together with the attached drawings in which like reference numerals indicate like parts in the various views.

Figure 1:
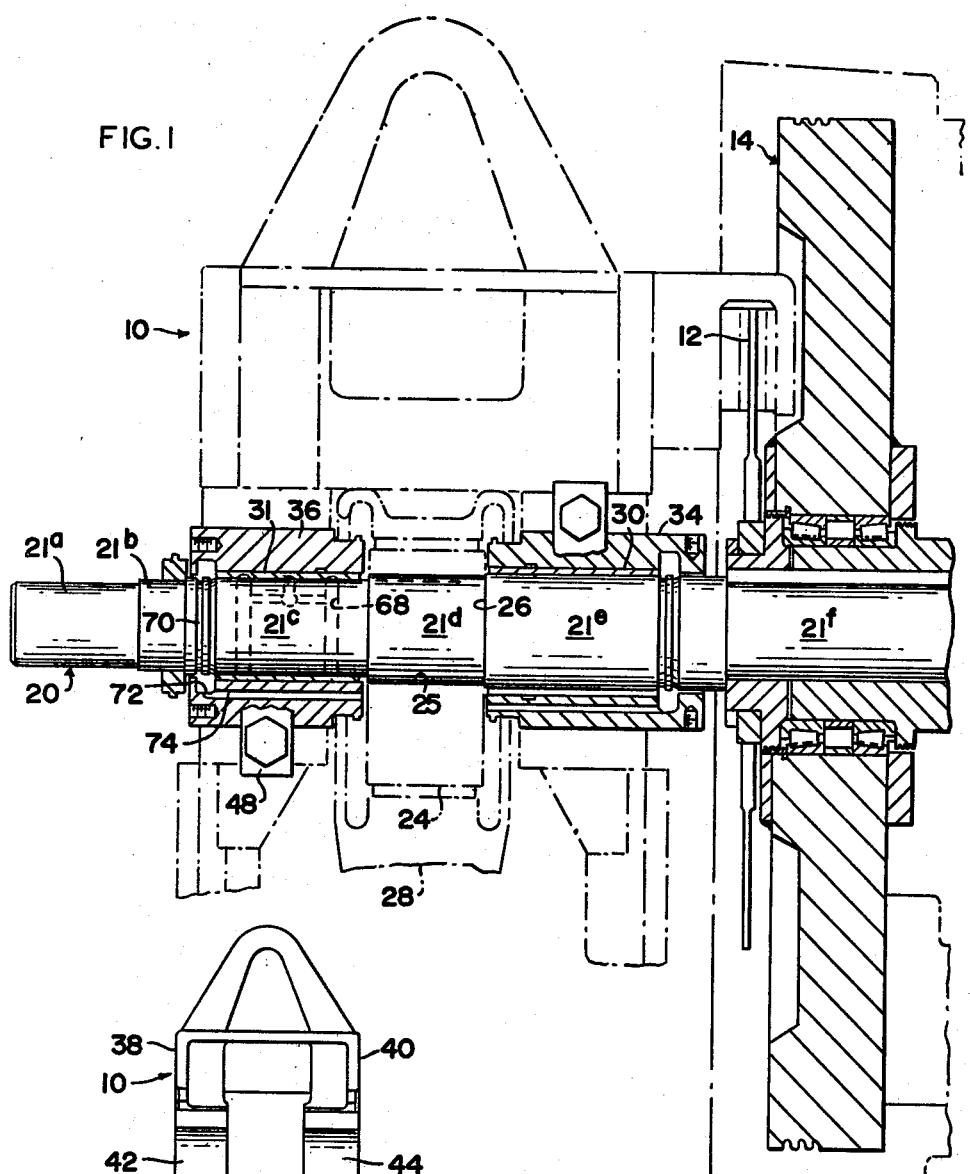
FIGURE 1 is a partial sectional view of the crankshaft assembly in a press.

Referring now to FIGURE 1, there is illustrated a crankshaft assembly particularly adapted for use in a press. The press, with the exception of the support for the crankshaft, has only been partially and schematically illustrated since for purposes of this invention the remaining elements of the press are conventional and well known. The press includes a vertical frame indicated generally by the reference numeral 10 in which there is rotatably supported a crankshaft indicated generally by the reference numeral 20. A brake disc 12 and a flywheel 14 as well as a clutch 16 are all supported on one end of the crankshaft 20 and function in conventional manner to control the rotation of the shaft. It will be appreciated that the particular clutch and brake as well as the flywheel form no part of this invention and are shown for purposes of illustration only. It is to be noted, however, that in the conventional press, the clutch, brake and flywheel are supported together at one end of the shaft thereby imposing on the shaft 20 a considerable load which is not present at the other end of the shaft.

The crankshaft 20 is of a stepped configuration and includes a plurality of stepped portions including stepped portions 21a, 21b, 21c, 21d, 21e and 21f. Any number of stepped portions may be formed on the crankshaft depending on the particular application. Each of the stepped portions is concentric to the other stepped portions and, thus, provides an essentially circular configuration for the shaft. An eccentric 24 is pre-machined to a desired configuration and includes an opening 25 extending therethrough with the shaft 20 extending through the opening 25. In this manner, the eccentric is positioned over the shaft 20 and, as shown in FIGURE 1, is in engagement with the stepped portion 21d. It is contemplated that a key or splines or other appropriate means may be used to interconnect the eccentric with the crankshaft so that the crankshaft and eccentric rotate as a unit. It will be noted that the positioning of the eccentric along the length of the shaft 20 is facilitated by the reduced diameter portions 21a–c and the presence of the radially extending shoulder 26 extending between the stepped portions 21d and 21e with the shoulder limiting movement of the eccentric longitudinally. As is conventional, a connecting rod 28 is received over the eccentric 24 and operates to impart reciprocation to the press in conventional manner.

The crankshaft 20 is rotatably supported on spaced bearings 30, 31 both of which are full round bearings or cylindrical in configuration and are slipped over the crankshaft 20. The bearing 30 is supported in a bearing housing 34 and bearing 31 is supported in a similar housing 36. However, due to the different diameters of the stepped portions 21c and 21e over which the bearings 31 and 30 are received, the diameters of the two bearings are different. Moreover, the inner diameters of the two housings 34, 36 are correspondingly different. It is important to note that the outer diameter of the two housings 34, 36 are the same.

Figure 3:
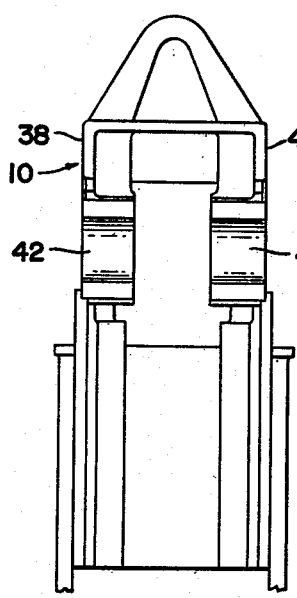
FIGURE 3 is a front elevation view of the basic frame in which the crankshaft assembly is supported.
Figure 4:
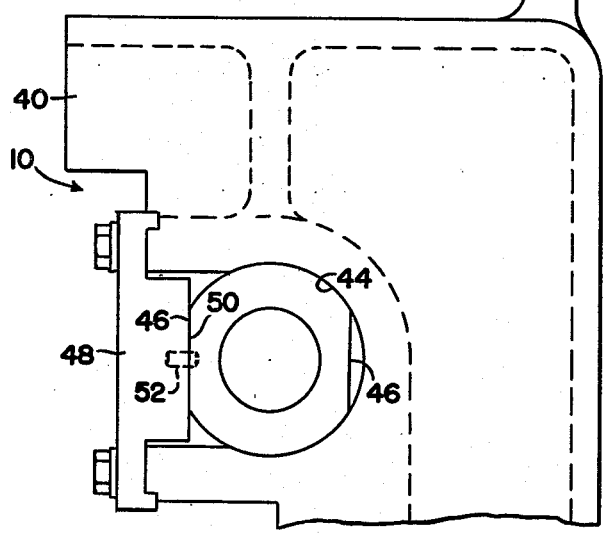
FIGURE 4 is an end elevation view of the crankshaft supported in the frame.

Referring now to FIGURE 3, there is illustrated the basic frame construction in which the crankshaft assembly is supported. The frame 10 includes upstanding spaced supports 38, 40 in which are formed axially aligned outwardly opening arcuate slots 42, 44 and in which the bearing housings 34, 36 are adapted to be received. The radius on which the arcuate slots 42, 44 is formed corresponds to the radial dimension of the housings 34, 36. The bearing housings are provided with flats 46 on opposite sides thereof with these flats being used to retain the housings, and thereby the bearings, from moving axially. Each bearing housing is retained in its respective slotted opening by the use of a T-bar retainer 48 having a flat surface 50 which cooperates with the flats on the bearing housings. A dowel pin 52 may be used as a locating means for orienting the bearing housing to the retainer with the retainers being removably secured by appropriate means, such as threaded fasteners, to the frame of the press. It is apparent from FIGURE 4 that the arcuate extent of the slots 42, 44 is greater than 180° thus requiring rotation of the bearing housings 34, 36 by 90° before the housings can be withdrawn from the slots.

It should be noted that the bearings 30, 31 and the bearing housings 34, 36 support the crankshaft immediately adjacent to the connection between the eccentric 24 and the connecting rod 28. In this manner, the shaft 20 is supported by the bearings adjacent to the area of highest loading and the bending moments normally imposed on the shaft 20 are minimized. Moreover, the stresses imposed on the crankshaft 20 due to the presence of the brake 12, flywheel 14 and clutch 16 on one end of the crankshaft may be compensated for by the use of the larger bearing 30 on the adjacent end of the crankshaft 20. This, of course, would be the case only when the press is being driven from the right hand end of the shaft 20 as shown in FIGURE 1. In the event it should be desired to drive the press from the opposite end of the shaft, it would be necessary only to remove the entire crankshaft assembly including the eccentric, the bearing housings, the brake, flywheel and clutch from the frame by releasing the retainers 48 and switching the crankshaft end for end thereby placing the drive on the left hand side of the press. Since the bearing housings 34, 36 are identical in external shape, the larger bearing 30 and housing 34 will still be on the end of the crankshaft which receives the greatest load. If it is desired to obtain a different stroke from the press, the crankshaft can be readily removed from the press frame in the same manner and the eccentric 24 pressed off the shaft 20 and a new pre-machined eccentric pressed on in its place.

Figure 2:
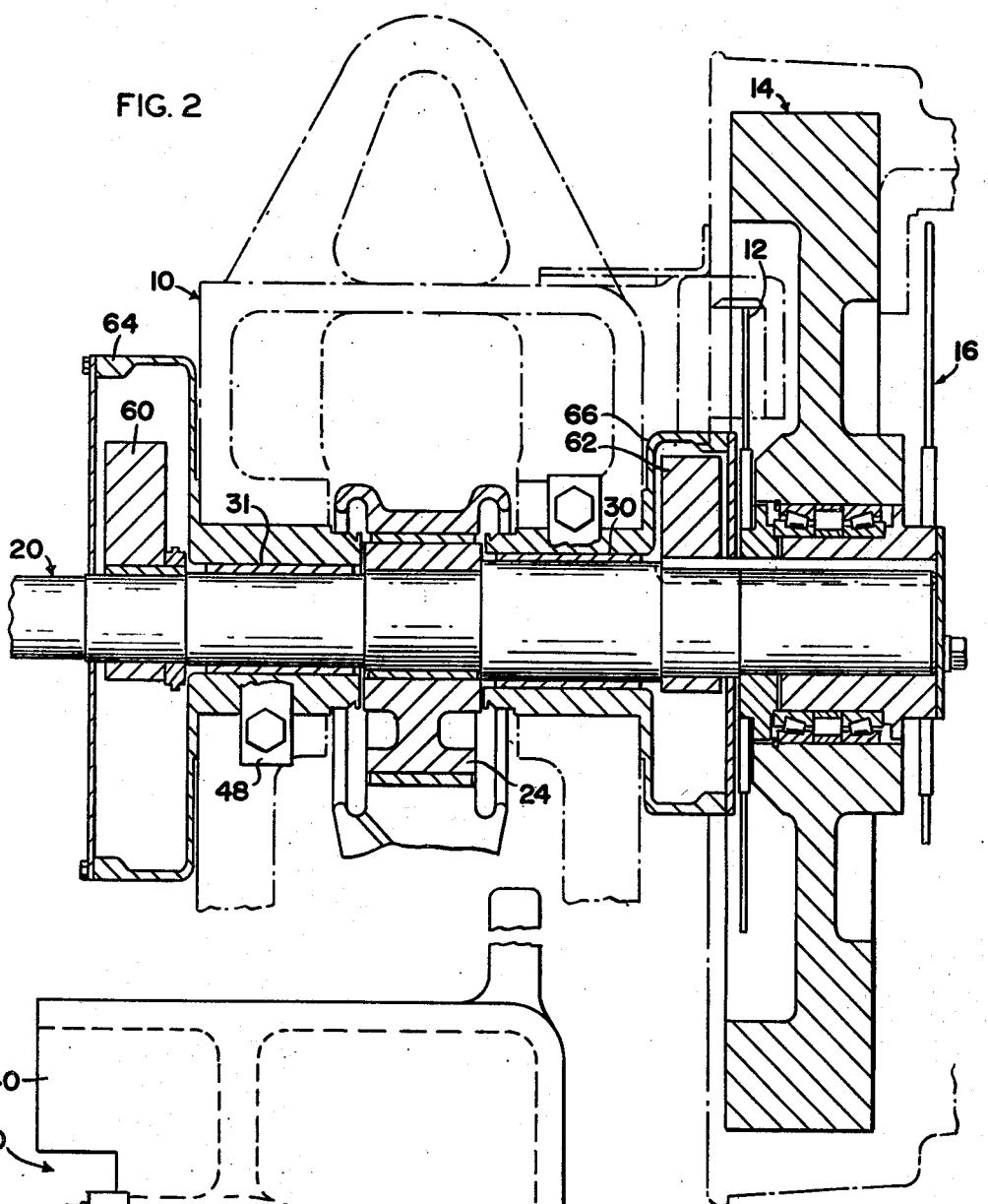
FIGURE 2 is a partial sectional view similar to FIGURE 1 illustrating the addition of counterweights to the crankshaft.

The crankshaft assembly shown in FIGURE 1 employs no counterweights since counterweights may not be required when the press is being operated at certain speeds. In the event that the press will be operated at speeds which require the use of counterweights, it is but a simple expedient to add the counterweights to the stepped concentric shaft 20 and this arrangement is shown in FIGURE 2. Thus, a counterweight 60 is non-rotatably secured to the stepped portion on the left hand end of the crankshaft 20. A similar counterweight 62 is non-rotatably secured to the crankshaft 20 between the bearing 30 and the brake disc. It should be noted that the two counterweights are disposed outside of the bearings which support the crankshaft and may be added or removed as desired without the necessity of removing the eccentric. Moreover, by positioning the counterweights 60, 62 in the manner shown, it is possible to retain the bearings 30, 31 in a position immediately adjacent the eccentric 24 so that the full support for the crankshaft is retained.

Appropriate guards or covers 64, 66 may be employed to provide protection against the rotation of the counterweights 60, 62. These guards or covers may be formed integrally with the bearing housings or may be removably secured to the housings.

It is believed apparent that the described crankshaft assembly and supporting frame provide a versatile drive for the press. Thus, the particular eccentric which is employed with the press may be readily changed to vary the stroke of the press without the necessity of replacing the entire crankshaft assembly. In addition, the press drive may be converted from a left hand drive to a right hand drive with a minimum of alterations in the press. Moreover, it is unnecessary to employ counterweights on the crankshaft when the press is to be operated at low speeds but counterweights may be readily added to the crankshaft when the speed of operation demands their use.

In addition to the versatility of the described mechanism, this invention provides a greatly simplified structure and one which reduces manufacturing costs. Thus, a stepped concentric shaft is much easier to manufacture as compared to the prior types of shafts which were manufactured with two centers. Moreover, the eccentrics can be simple machined parts with a common diameter passage 25 with the eccentrics varying only in external configuration thereby permitting use of a single shaft to obtain different strokes.

An additional advantage of the invention is its ease of assembly. The split bearings heretofore required for crankshafts are eliminated since the crankshaft is concentric and cylindrical throughout its length permitting the bearings to be slipped over the crankshaft. Moreover, the bearings are full round bearings which are easy to assemble and do not require the use of shims as had been the case heretofore. Moreover, the entire crankshaft assembly may be pre-assembled with the eccentrics, bearings, bearing housings, brake and clutch all being assembled on the crankshaft and the entire package assembled to the frame of the press. If counterweights are to be employed, these too can be pre-assembled on the crankshaft before the shaft is inserted in the frame.

In addition to the above-mentioned advantages, an additional advantage is the improved lubrication characteristics of the crankshaft assembly. By employing full round bearings, oil grooves 68 may be provided on the inner periphery of the bearings to improve the lubrication of the bearings. In addition the crankshaft may employ lubrication grooves 70 formed in the periphery thereof and positioned longitudinally of the shaft 20 radially inwardly of circular recesses or grooves 72 in the bearing housings 34, 36. The bearing housings are drilled to provide longitudinally extending passages 74 which provide a path for the lubricant to travel through the housings from the recesses 72 back to the area of the eccentric 24 and the connection rod 28. It is also contemplated that additional lubrication may be distributed through use of the counterweights 60, 62 as oil slingers to control oil at a predetermined location. It again should be noted that the lubrication system is self-contained within the crankshaft assembly so that as the crankshaft is removed from the frame, as for example, when it is desired to shift from a right hand to a left hand drive, the lubrication system remains undisturbed.

Finally, and very importantly the above-described assembly has strong mechanical characteristics which are of the very essence in press drives. The bearings 30, 31 are located close to the connection between the connecting rod and the eccentric thereby providing rigid support for the crankshaft and virtually eliminating the possibility of any bending moments which would bend the shaft. Moreover, the crankshaft is so designed that a larger bearing may be employed on the end of the crankshaft adjacent the clutch and brake thereby providing increased support for the added loads imposed on the shaft by the clutch and brake.

Changes and modifications in the above-described invention will suggest themselves to those having ordinary skill in the art and it is contemplated that such changes and modifications are to be included within the scope of the invention.

Having thus described my invention, I claim:

1. In a press having a frame, a crankshaft rotatably supported by bearings on said frame and connecting rod means, the improvement comprising:
said crankshaft having a plurality of axially spaced concentric stepped portions;
a pre-machined eccentric having an opening therethrough with said opening in said eccentric having a diameter which is greater than the diameter of at least one of said stepped portions;
said eccentric being received over said one stepped portion of said crankshaft and in engagement with another one of said stepped portions whereby said crankshaft and said eccentric rotate as a unit;
said eccentric being in driving engagement with said connecting rod;
said bearings being in rotatable engagement with said stepped portions immediately adjacent said eccentric and on either of said eccentric.

2. The improvement of claim 1 and further including counterweight means having an opening therethrough;
said counterweight means being receivable over said crankshaft and in engagement with another one of said stepped portions whereby said crankshaft, said eccentric and said counterweight means rotate as a unit;
one of said bearings supporting said crankshaft between said eccentric and said counterweight means.

3. A drive assembly for a press including a frame,
a pair of spaced apart outwardly opening slots in said frame,
said drive assembly including a crankshaft and a pair of bearings rotatably supporting said crankshaft,
bearing housings supporting each of said bearings,
said bearing housings being receivable in said slots; and
releasable retaining means on said frame cooperating with said bearing housings to releasably retain said housings in said openings whereby said crankshaft assembly including said bearings and bearing housings may be removed as a unit from said frame.

4. The combination of claim 3 wherein at least one of said bearing housings includes a radially extending circular recess formed on the inner periphery thereof,
longitudinal passage means in said housing,
said passage means communicating at its inner end with the recess and opening outwardly of said bearing at its other end.

5. The combination of claim 3 wherein said bearing housings have substantially the same external configuration and may be interchangeably received in either of said slots.

6. The improvement of claim 5 wherein one of said bearings is larger than the other of said bearings.

7. The combination of claim 3 wherein said crankshaft assembly further includes counterweight means removably secured to said crankshaft at a point axially spaced along said crankshaft outwardly of said bearings.

8. The combination of claim 3 wherein the outer periphery of said bearing housings are generally cylindrical in configuration;
said slots including an arcuate portion formed on a radius corresponding to the radius of said cylindrical housings,
said arcuate portions extending through an angle of greater than 180°; and
flats formed on opposed sides of said housings whereby said housings may be inserted in or removed from the arcuate portions of said slots.

References Cited

UNITED STATES PATENTS

| | | | |
|---|---|---|---|
| 1,783,664 | 12/1930 | McGovern | 74—603 |
| 1,834,790 | 12/1931 | Logue | 74—603 XR |
| 2,504,747 | 4/1950 | Steenstrup | 308—23 |
| 2,632,340 | 3/1953 | Dolza et al. | 74—603 |
| 2,796,769 | 6/1957 | Gratzmuller | 74—595 XR |
| 2,821,444 | 1/1958 | Brown | 308—23 |
| 3,187,591 | 6/1965 | Johnson | 74—570 XR |
| 3,300,972 | 1/1967 | Schott | 74—44 XR |

FOREIGN PATENTS 1,178,085   12/1958   France.

FRED C. MATTERN, Jr., Primary Examiner

M. A. ANTONAKAS, Assistant Examiner

U.S. Cl. X.R.

74—44; 308—23